United States Patent Office 2,955,927
Patented Oct. 11, 1960

2,955,927

LIGHT-DIFFUSING GLASS AND PROCESS FOR MAKING THE SAME

Hisae Ogata, P.O. Box 1707 Central, Tokyo, Japan

No Drawing. Filed July 10, 1957, Ser. No. 670,883

Claims priority, application Japan Feb. 21, 1957

5 Claims. (Cl. 41—42)

The present invention relates to a light-diffusing glass and to a process for producing glass that diffuses light. More particularly, it relates to glass having the property of diffusing light and produced from transparent glass by processing through special chemical treatments.

An object of the present invention is to provide light-diffusing glass having a softer and more elegant color or tone than the usual frosted glass, this object being achieved by special chemical treatment of transparent glass.

A further object of the present invention is to provide light-diffusing glass that gives remarkable effects when used for picture framing, art decorations, window glasses, indirect light plates, television screens and lamp shades. Pictures framed with this glass, for example, do not reflect glare as mirror images and break up the glare so that the picture shows through much clearer from various angles than can a picture covered with ordinary framing glass.

Other objects and advantages of the invention will occur to one skilled in the art from reading the following detailed description.

Broadly speaking, the process of the present invention comprises two main steps. In the first step, transparent glass is immersed in a water solution of ammonium fluoride and glacial acetic acid, preferably for a period of between 10 and 30 minutes at a temperature of between 15° C. and 30° C. In the second step, the same glass is later immersed in a solution of hydrofluoric acid, preferably for a period of between 2 and 5 minutes at a temperature between 15° C. and 30° C.

The preferred way of carrying out the present invention is as follows: In the first place, dust, oil, and other foreign matter that may be stuck to the transparent glass are washed off. As a preliminary treatment for this purpose a weak solution of acid may be employed. For example, a solution of 10 parts by weight of 56% hydrofluoric acid in 100 parts of water, may be used.

Following this preparatory immersion, the transparent glass is next immersed in the water solution of ammonium fluoride and glacial acetic acid. A preferable example of the composition of this solution consists, by weight, of

| | Parts |
|---|---|
| 95% powdered ammonium fluoride | 10 |
| 78% glacial acetic acid | 5 |
| Water | 5 |

The first step (after the preliminary cleaning) is immersion in this mixture for between 10 and 30 minutes (preferably between 15 and 20 minutes) at a temperature of between 15° C. and 30° C. (preferably, about 20° C.). As a specific example, it may be immersed in the solution for 15 minutes at 20° C. When the glass is taken out of this solution, it is whitened evenly.

Subsequent to this first step, the glass is immersed in a solution preferably comprising 50% to 60% hydrofluoric acid for between two and five minutes at between 15° C. and 30° C. Preferably, it is immersed at 20° C. for two periods of about two minutes each. The glass so processed is light-diffusing and has a unique soft coloring tone.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A process for producing light-diffusing glass from transparent glass, comprising the steps of immersing the transparent glass in a solution of 10 parts by weight of ammonium fluoride, 5 parts by weight of glacial acetic acid, and 5 parts by weight of water; and subsequently immersing the glass in a water solution of hydrofluoric acid having a strength between 50% and 60%.

2. The process of claim 1 wherein the immersion in the first solution is for between 10 and 30 minutes at a temperature between 15° C. and 30° C. and wherein the immersion time in the hydrofluoric acid solution lies between 2 and 5 minutes at a temperature between 15° C. and 30° C.

3. The process of claim 2 wherein said glass is immersed in a weak solution of 10 parts by weight of 56% hydrofluoric acid in 100 parts of water before being immersed in the solution of ammonium fluoride and glacial acetic acid.

4. A process for producing light-diffusing glass from transparent glass, comprising the steps of immersing the transparent glass in a solution comprising 10 parts by weight of 95% ammonium fluoride, 5 parts by weight of glacial acetic acid calculated at a strength of 78%, and 5 parts by weight of water, and subsequently immersing the glass in a water solution of hydrofluoric acid.

5. The process of claim 4 wherein the immersion in the first solution is for between 10 and 30 minutes at a temperature between 15° C. and 30° C.

References Cited in the file of this patent

UNITED STATES PATENTS

| 121,696 | Webb | Dec. 7, 1871 |
| 1,772,965 | Smith | Aug. 12, 1930 |
| 1,875,819 | Naruse | Sept. 6, 1932 |
| 2,071,816 | Cummings | Feb. 23, 1937 |
| 2,390,404 | Walker | Dec. 4, 1945 |